(12) United States Patent
Sequeira et al.

(10) Patent No.: US 11,340,929 B2
(45) Date of Patent: May 24, 2022

(54) HYPERVISOR AGNOSTIC CLOUD MOBILITY ACROSS VIRTUAL INFRASTRUCTURES

(71) Applicant: VMware, Inc., Palo Alto, CA (US)

(72) Inventors: Allwyn Sequeira, Saratoga, CA (US);
Sachin Thakkar, San Jose, CA (US);
Serge Maskalik, Los Gatos, CA (US);
Debashis Basak, San Jose, CA (US);
Mark Whipple, Golden, CO (US)

(73) Assignee: VMWARE, INC., Palo Alto, CA (US)

( * ) Notice: Subject to any disclaimer, the term of this patent is extended or adjusted under 35 U.S.C. 154(b) by 86 days.

(21) Appl. No.: 16/417,533

(22) Filed: May 20, 2019

(65) Prior Publication Data
US 2019/0361734 A1  Nov. 28, 2019

Related U.S. Application Data

(60) Provisional application No. 62/675,096, filed on May 22, 2018.

(51) Int. Cl.
*G06F 9/455* (2018.01)
*H04L 67/1012* (2022.01)
(Continued)

(52) U.S. Cl.
CPC .......... *G06F 9/45558* (2013.01); *G06F 9/455* (2013.01); *G06F 9/4862* (2013.01); *G06F 9/5077* (2013.01); *H04L 9/3268* (2013.01); *H04L 63/0428* (2013.01); *H04L 67/1012* (2013.01); *G06F 9/45541* (2013.01); *G06F 2009/4557* (2013.01); *G06F 2009/45595* (2013.01)

(58) Field of Classification Search
CPC ... G06F 2009/4557; G06F 2009/45595; G06F 9/455; G06F 9/45541; G06F 9/45558; G06F 9/4862; G06F 9/5077; H04L 63/0209; H04L 63/0428; H04L 63/0823; H04L 67/1012; H04L 67/34; H04L 9/3268
See application file for complete search history.

(56) References Cited

U.S. PATENT DOCUMENTS 8,631,458 B1    1/2014 Banerjee
9,626,512 B1 *  4/2017 Brandwine ............. G06F 21/57
(Continued)

FOREIGN PATENT DOCUMENTS

EP         3128418 A1    2/2017

*Primary Examiner* — Jorge A Chu Joy-Davila
(74) *Attorney, Agent, or Firm* — Patterson & Sheridan, LLP

(57) ABSTRACT

Techniques disclosed herein relate to migrating virtual computing instances such as virtual machines (VMs). In one embodiment, VMs are migrated across different virtual infrastructure platforms by, among other things, translating between resource models used by virtual infrastructure managers (VIMs) that manage the different virtual infrastructure platforms. VM migrations may also be validated prior to being performed, including based on resource policies that define what is and/or is not allowed to migrate, thereby providing compliance and controls for borderless data centers. In addition, an agent-based technique may be used to migrate VMs and physical servers to virtual infrastructure, without requiring access to an underlying hypervisor layer.

14 Claims, 8 Drawing Sheets

(51) Int. Cl.
    *G06F 9/50*           (2006.01)
    *G06F 9/48*           (2006.01)
    *H04L 9/32*           (2006.01)
    *H04L 29/06*         (2006.01)

(56) References Cited

U.S. PATENT DOCUMENTS

| | | |
|---|---|---|
| 9,712,503 B1 * | 7/2017 | Ahmed .................. G06F 21/606 |
| 2002/0143855 A1 | 10/2002 | Traversat et al. |
| 2009/0154709 A1 | 6/2009 | Ellison |
| 2010/0229181 A1 * | 9/2010 | Ahuja .................. G06F 9/45558 718/107 |
| 2012/0151476 A1 * | 6/2012 | Vincent ............... G06F 9/45558 718/1 |
| 2013/0152076 A1 | 6/2013 | Patel |
| 2014/0229944 A1 * | 8/2014 | Wang .................... G06F 9/5088 718/1 |
| 2015/0040127 A1 | 2/2015 | Dippenaar et al. |
| 2015/0052523 A1 * | 2/2015 | Raghu .................. G06F 9/45558 718/1 |
| 2015/0169306 A1 | 6/2015 | Labocki et al. |
| 2015/0312356 A1 | 10/2015 | Roth et al. |
| 2016/0105488 A1 | 4/2016 | Thakkar et al. |
| 2017/0060628 A1 | 3/2017 | Tarasuk-Levin et al. |
| 2017/0177840 A1 | 6/2017 | Srivastava et al. |
| 2017/0257432 A1 | 9/2017 | Fu et al. |
| 2018/0248827 A1 | 8/2018 | Scharber et al. |
| 2019/0095232 A1 | 3/2019 | Okuno et al. |

\* cited by examiner

HYPERVISOR AGNOSTIC CLOUD MOBILITY ACROSS VIRTUAL INFRASTRUCTURES

CROSS-REFERENCE TO RELATED APPLICATIONS

This application claims priority to U.S. provisional application having Ser. No. 62/675,096, filed on May 22, 2018, which is hereby incorporated by reference herein in its entirety.

BACKGROUND

Cloud architectures are used in cloud computing and cloud storage systems to offer infrastructure-as-a-service (IaaS) cloud services. Examples of cloud architectures include the VMware vCloud Director® cloud architecture software, Amazon EC2™ web service, and OpenStack® open source cloud computing service. IaaS cloud service is a type of cloud service that provides access to physical and/or virtual resources in a cloud environment. These services provide a tenant application programming interface (API) that supports operations for manipulating IaaS constructs such as virtual machines (VMs) and logical networks. However, the use of such public cloud services is typically kept separate from the use of existing computing resources in data centers managed by an enterprise.

With an increasing trend in migrating data centers to cloud platforms, a hybrid model has been developed that combines public cloud services and traditional on-premise data center computing resources. Such hybrid cloud computing systems permit workloads, such as virtual machines, to be rapidly moved from the data center to the cloud.

SUMMARY

One embodiment disclosed herein provides a computer-implemented method of migrating a physical computing system or virtual computing instance to a virtual infrastructure. The method generally includes determining configuration information via introspection of an operating system (OS) running in the physical computing system or virtual computing instance, where a virtual computing instance shell is created in the virtual infrastructure based, at least in part, on the determined configuration information. The method further includes streaming data of a disk associated with the physical computing system or the virtual computing instance to the virtual infrastructure, where the streamed data is injected into the virtual computing instance shell.

Further embodiments include a computer system configured to carry out the above method, and a non-transitory computer-readable storage medium comprising instructions that cause a computer system to carry out the above method.

DETAILED DESCRIPTION

Embodiments disclosed herein relate to migrating virtual computing instances. Virtual machines (VMs) are used herein as a reference example of virtual computing instances, but techniques disclosed herein are also applicable to other types of virtual computing instances, such as containers. In one embodiment, VMs are migrated across different virtual infrastructure platforms by translating between resource models used by virtual infrastructure managers (VIMs) that manage the different virtual infrastructure platforms. As used herein, a "virtual infrastructure" refers to an infrastructure that supports virtual computing instances such as VMs. A virtual infrastructure may include virtualization and management layers that abstract host hardware resources into multiple virtual computing instances running concurrently on the same hosts and that pool and manage the resources of multiple hosts, respectively. The management layer of a virtual infrastructure is also referred to herein as the VIM, and different virtual infrastructure platforms may include VIMs that use their own, distinct resource models. By translating metadata associated with a VM from the resource model of a VIM that manages a source virtual infrastructure to another resource model (which is also referred to herein as the "base resource model") used by a hybridity manager, and then transmitting the translated metadata to another hybridity manager that further translates the metadata to a resource model used by a VIM that manages a destination virtual infrastructure, a VM shell (also sometimes referred to as a "shadow VM") can be created in the destination virtual infrastructure based on the translated metadata. Disk contents of the VM may then be transferred and injected into the VM shell to create a new VM.

VM migrations may also be validated prior to being performed, based in part on resource policies that define what is and/or is not allowed to migrate. In one embodiment, hybridity managers store application definitions that include policies specifying where VMs in those applications are allowed to migrate, and VM migrations are validated based at least on such policies. In addition, an agent-based technique is disclosed for migrating VMs and physical servers to a destination virtual infrastructure, without requiring access to an underlying hypervisor layer, by using an agent to introspect the operating system (OS) running in a VM or physical server, determining configuration information based on the introspection, securely transmitting the configuration information to a hybridity manager, creating a VM shell in the destination virtual infrastructure using the transmitted configuration information, and transferring and injecting contents of the VM or physical server's disk into the VM shell.

System Overview

Figure 1:
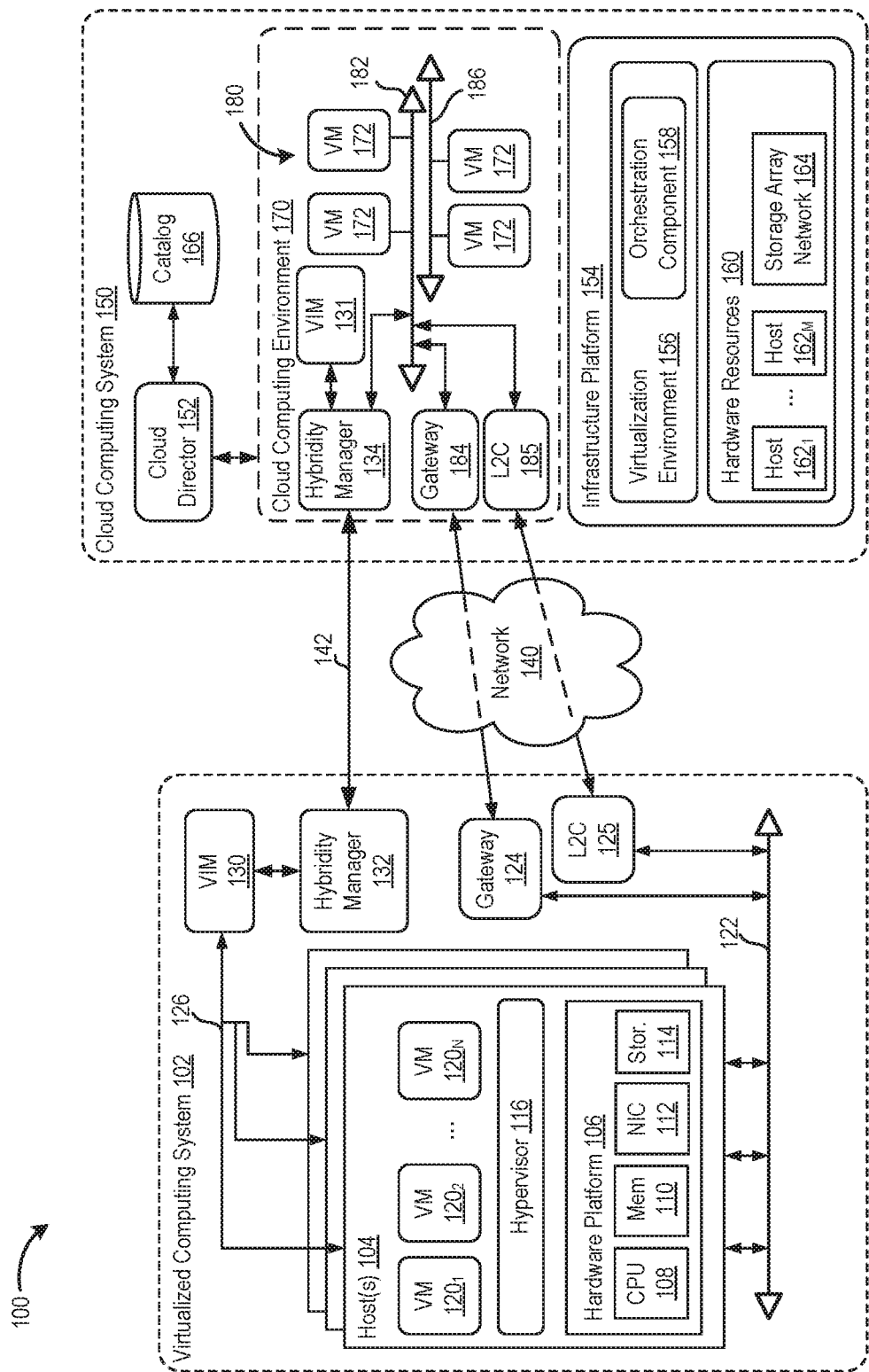
FIG. 1 is a block diagram illustrating a hybrid cloud computing system in which one or more embodiments of the present disclosure may be utilized.

FIG. 1 is a block diagram illustrating a hybrid cloud computing system 100 in which one or more embodiments of the present disclosure may be utilized. As shown, hybrid cloud computing system 100 includes a virtualized computing system 102 and a cloud computing system 150. Hybrid cloud computing system 100 is configured to provide a common platform for managing and executing virtual workloads seamlessly between virtualized computing system 102 and cloud computing system 150. Although virtualized computing system 102 and cloud computing system 150 are shown for illustratively purposes, a hybrid cloud computing system may generally include virtual infrastructures implemented in any number of data centers.

In one embodiment, virtualized computing system 102 may be a data center controlled and administrated by a particular enterprise or business organization, while cloud computing system 150 may be operated by a cloud computing service provider and exposed as a service available to account holders, such as the particular enterprise in addition to other enterprises. In such a case, virtualized computing system 102 may be referred to as an on-premise data center(s), and cloud computing system 150 may be referred to as a "public" cloud service. In some embodiments, virtualized computing system 102 may be configured as a private cloud service providing cloud services to various organizations within the enterprise. In other embodiments, virtualized computing system 102 and cloud computing system 150 may both be public clouds.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In a hybrid cloud, a tenant may be provided with seamless access to one or more private cloud resources and/or public cloud resources.

Virtualized computing system 102 includes one or more host computer systems 104. Each of hosts 104 may be constructed on a server grade hardware platform 106, such as an x86 architecture platform. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processors 108 are configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as networks 122 and 126 within virtualized computing system 102. Network interface 112 may include one or more network adapters, also referred to as network interface cards (NICs). Storage 114 represents local storage devices (e.g., one or more hard disks, flash memory modules, solid state disks, and optical disks) and/or a storage interface that enables host 104 to communicate with one or more network data storage systems. Examples of a storage interface include a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere® solution made commercially available from VMware, Inc. Hypervisor 116 may run on top of the operating system of host 104 or directly on hardware components of host 104. In addition, hypervisor 116 may provide a virtual switch (not shown), which is a software-based switch acting as a layer 2 (L2) forwarding engine and capable of performing VLAN tagging, stripping, filtering, L2 security, checksum, segmentation offload units, and other tasks typically performed by physical switches. The virtual switch may include uplink ports which connect to physical network adapters, as well as VM ports which connect to virtual network adapters and provide connections for hypervisor 116 and VMs. In one embodiment, the virtual switch may be part of a distributed virtual switch that is an abstraction of a switch across multiple host servers and that permits virtual switches on the multiple host servers to be managed as if ports of those virtual switches belonged to a single switch, the distributed virtual switch.

Virtualized computing system 102 further includes a virtualization management module, which is depicted in FIG. 1 as virtual infrastructure manager (VIM) 130. As shown, VIM 130 communicates with the plurality of hosts 104 via a network 126, sometimes referred to as a management network. In one embodiment, VIM 130 is a computer program that resides and executes in a central server, which may reside in virtualized computing system 102, or alternatively, VIM 130 may run as a VM in one of hosts 104. One example of a VIM is the vCenter Server® product made available from VMware, Inc. VIM 130 is configured to carry out administrative tasks for virtualized computing system 102, including managing hosts 104, managing VMs 120 running within each host 104, provisioning VMs, migrating VMs from one host to another host, and load balancing between hosts 104.

As shown, virtualized computing system 102 further includes a hybridity manager 132 that is in communication with VIM 130 and configured to manage and integrate virtualized computing resources provided by cloud computing system 150 with virtualized computing resources of virtualized computing system 102 to form a unified "hybrid" computing platform. In one embodiment, hybridity manager 132 is configured to deploy VMs in cloud computing system 150, transfer VMs from virtualized computing system 102 to cloud computing system 150, and perform other "cross-cloud" administrative tasks, as described in greater detail below. Although shown as a separate computer program, which may execute in a central server or run in a VM in one of hosts 104, hybridity manager 132 may alternatively be a module or plug-in complement to VIM 130.

In one or more embodiments, cloud computing system 150 is configured to dynamically provide an enterprise (or users of an enterprise) with one or more virtual data centers 170 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as a multi-tenant cloud service with logically isolated virtualized computing resources on a shared physical infrastructure. It is recognized that cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web application or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and virtual machine packages that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A virtual machine package is a logical container of one or more pre-configured virtual machines that package applications and parameters that define operational details of the package. An example of a VM package is vApp™ technology made available by VMware, Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual machine) is configured to provide VMs 172 and other components in cloud computing environment 170 with connectivity to an external network 140 (e.g., Internet). Gateway 184 manages external public IP addresses for virtual data center 180 and one or more private internal networks interconnecting VMs 172. Gateway 184 is a WAN facing device providing services such as intelligent routing, traffic steering, WAN optimization, encryption, etc. Gateway 184 may be configured to provide virtual private network (VPN) connectivity over a network 140 with another VPN endpoint, such as a gateway 124 within virtualized computing system 102. In other embodiments, gateway 184 may be configured to connect to and communicate with virtualized computing system 102 using a high-throughput, dedicated link between virtualized computing system 102 and cloud computing system 150. Layer 2 concentrators (L2C) 125 and 185 are parallel to gateways 124 and 184 and configured to provide a "stretched" L2 network that spans virtualized computing system 102 and cloud computing system 150. The stretched network may be separate from the network used by gateways 124 and 184 so that, e.g., VM migration traffic over a network used by gateways 124 and 183 does not create latency in the stretched network.

As shown, cloud computing system 150 includes a hybridity manager 134 configured to communicate with the corresponding hybridity manager 132 in virtualized computing system 102 to enable a common virtualized computing platform between virtualized computing system 102 and cloud computing system 150. Hybridity manager 134 (e.g., executing as a virtual machine) may communicate with hybridity manager 132 using Internet-based traffic via a VPN tunnel established between gateways 124 and 184, or alternatively, using direct connect 142. In addition, hybridity manager 134 is in communication with a VIM 131, which may perform similar functionalities as VIM 130, described above.

Migrating VMs Across Virtual Infrastructure Platforms

Figure 2:
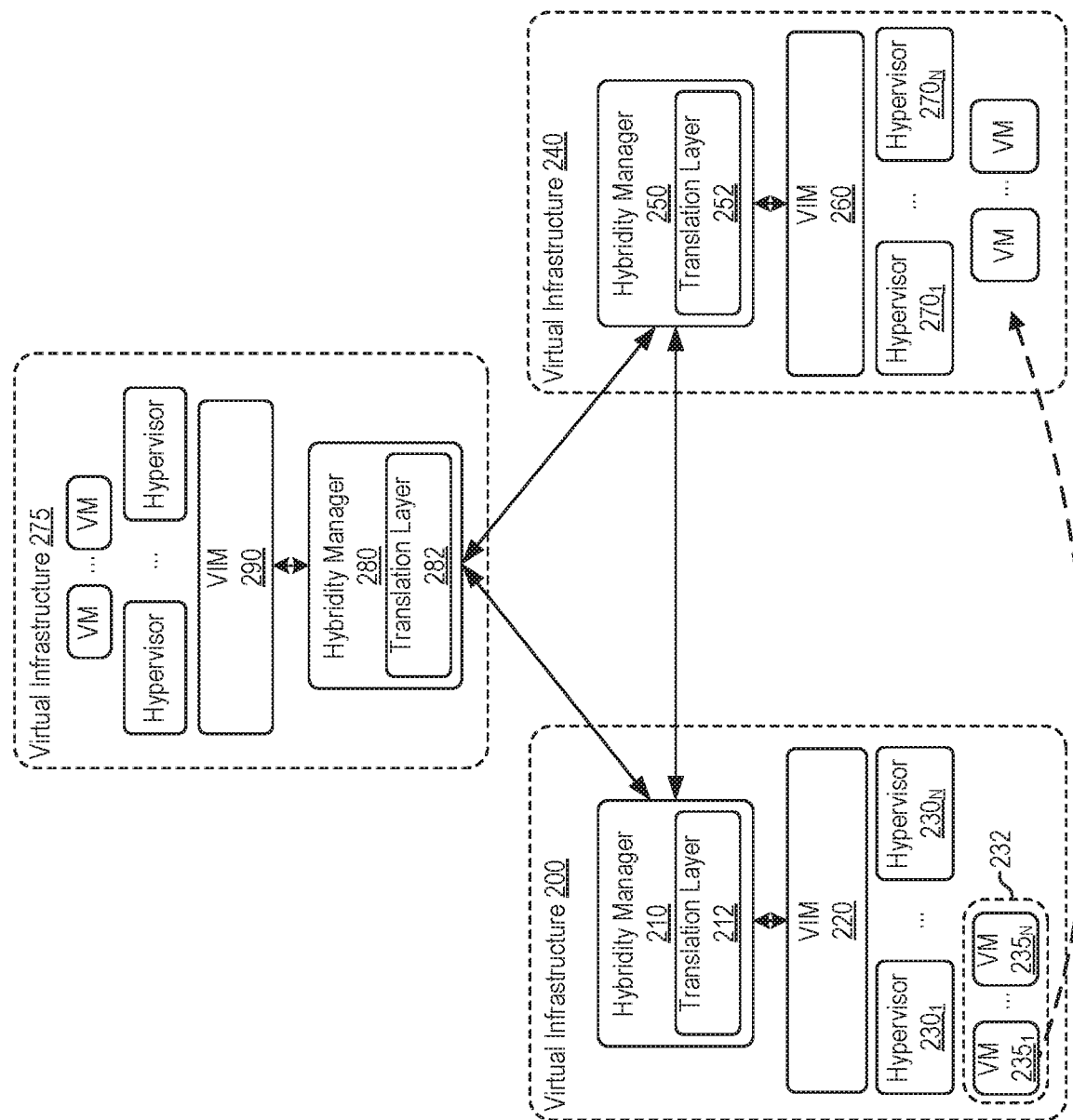
FIG. 2 illustrates an approach for migrating virtual machines (VMs) across virtual infrastructure platforms, according to an embodiment.

FIG. 2 illustrates an approach for migrating VMs across virtual infrastructure platforms, according to an embodiment. The disclosed approach permits VM migrations across different types of virtual infrastructure platforms, such as VM migrations from an OpenStack® platform running kernel-based virtual machine (KVM) to a vSphere® platform running ESXi and managed by a vCenter Server®, between different versions of vSphere®, or the like. A user may initiate such a VM migration across virtual infrastructure platforms to, e.g., shift or rebalance VMs between virtual infrastructures implemented using different virtual infrastructure platforms. For example, such rebalancing may be performed for cost optimization purposes if specialized equipment that is cheaper becomes available and VMs are migrated to utilize the specialized equipment. However, VMs could traditionally only be migrated across the same type of virtual infrastructure platform or versions thereof. As discussed in greater detail below, one embodiment enables VM migrations across different types of virtual infrastructure platforms by translating between resource models used by those virtual infrastructure platforms. As a result, infrastructure management for cloud mobility can become virtual infrastructure platform agnostic.

As shown, a VM $235_1$, which is part of an application 232 that includes multiple VMs $235_{1-N}$, is migrated from a virtual infrastructure 200 to a virtual infrastructure 240, thereby stretching application 232 across virtual infrastructures 200 and 240. For example, application 232 may be a three-tier application that includes a web-facing application VM, a business rules VM, and a database VM. Such an application may be created from, e.g., a VM package such as that described above. Although discussed herein primarily with respect to applications that include multiple VMs, it should be understood that techniques disclosed herein are also applicable to VMs that are not part of an application. In addition to the migration of VM $235_1$, a network that VMs $235_{1-N}$ are on may be logically extended such that the network is reachable across virtual infrastructures 200 and 240.

Each of virtual infrastructures 200, 240, and 275 includes a pool of infrastructure resources and may be implemented using a system such as virtualized computing system 102 or cloud computing system 150, described above. Illustratively, virtual infrastructures 200, 240, and 275 are implemented using different virtual infrastructure platforms. Examples of virtual infrastructure platforms include the OpenStack®, vSphere®, and Azure® platforms. However, it should be understood that from a user's perspective, application 232 should be the same no matter where VMs $235_{1-N}$ of the application 232 run.

In order to migrate a VM (e.g., VM $235_1$) between different virtual infrastructure platforms, such as from the OpenStack® platform to the vSphere® platform or vice versa, one embodiment translates between resource models used by VIMs of those virtual infrastructure platforms to manage resources. Each virtual infrastructure platform includes a virtual infrastructure management layer, shown as VIMs 220, 260, and 290 for virtual infrastructure 200, 240, and 275, respectively. VIMS 220, 260, and 290 are responsible for managing virtual infrastructures 200, 240, or 275, respectively. In particular, VIMS 220, 260, and 290 may be configured to perform tasks such as managing VMs running within hosts, provisioning VMs, migrating VMs from one host to another host, and load balancing between hosts. Examples of VIMs include vCenter Server®, OpenStack®, vCloud Director®, and the Kubernetes® management layer. It is assumed herein that VIMs 220, 260, and 290 are different, and that each of VIMs 220, 260, and 290 uses a different resource model. As a result, migrating a VM between virtual infrastructures 200, 240, and/or 275 that are managed by VIMs 220, 260, and 290, respectively, requires translating between the resource models used by VIMs 220, 260, and 290, which involves mapping object constructs between the different resource models.

In one embodiment, a hybridity manager (e.g., hybridity manager 210, 250, or 280) may utilize its own resource object model, also referred to herein as the "base resource model," and translate VM metadata retrieved from a VIM (e.g., VIM 220, 260, or 290) that the hybridity manager is in communication with into a representation of the metadata in the base resource model. As used herein, VM metadata refers to metadata (1) relating to the VM itself (e.g., metadata that would typically be included in a VMX or KVM image), (2) as well as surrounding the VM, such as attributes that are needed for the VM to connect to its surroundings or perform optimally. Conversely, VM metadata represented in the base resource model may be transmitted to another hybridity manager for translation back into VM metadata represented in a resource model used by the other VIM so that VMs can be created (e.g., by invoking an API exposed by the other VIM) based on such VM metadata. Illustratively, each of hybridity managers 210, 250, and 280 includes a respective translation layer 212, 232, and 282 that is responsible for translating VM metadata received from VIMs 220, 260, and 290, respectively, into the base resource model format used by hybridity managers 210, 250, and 280, and vice versa. That is, translation layers 212, 232, and 282 translate VM metadata in and out of the base resource model, and VM metadata represented in the base resource model may further be exchanged between hybridity managers 210, 250, and 280.

In one embodiment, VM metadata that has been translated into the base resource model format may be stored in VM descriptors. Such VM descriptors may be stored separately or as part of an application definition. An application definition may include multiple VM descriptors associated with respective VMs in an application, as well as an application-specific descriptor that includes metadata specifying overall policies of the application. In one embodiment, the application definition for an application may be stored in each hybridity manager associated with a virtual infrastructure where at least one VM of the application is running, and the stored application definitions may be updated and exchanged between such hybridity managers to reflect the current state of the application, as discussed in greater detail below.

Figure 3:
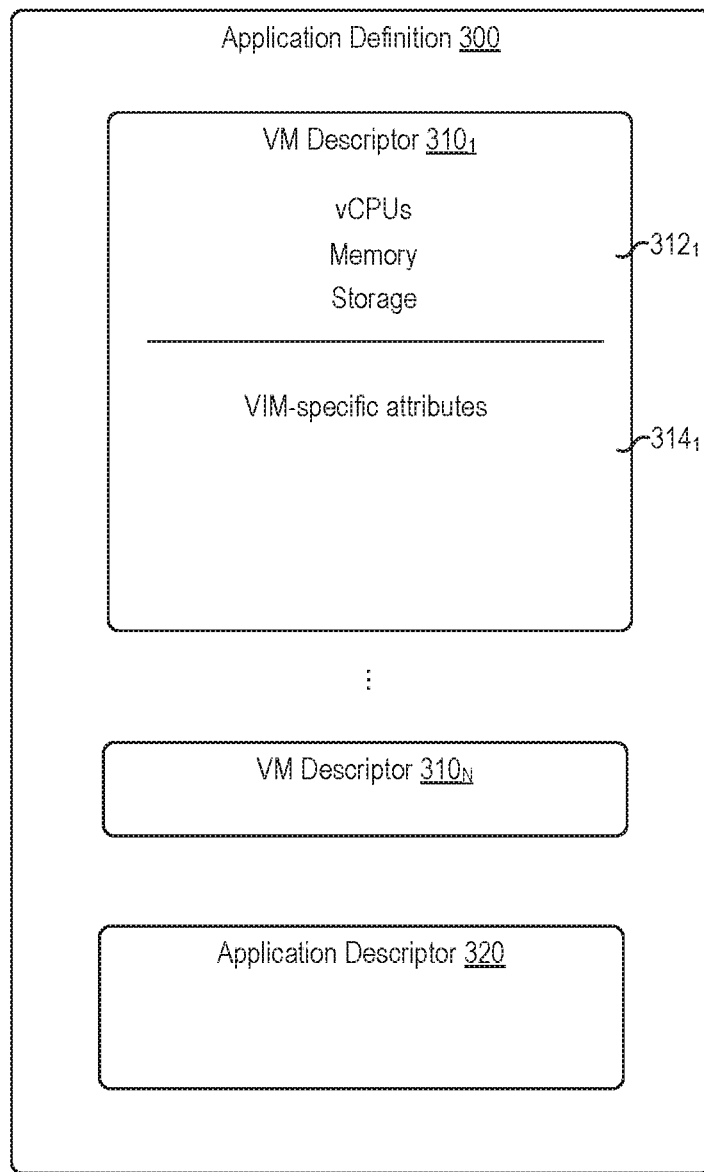
FIG. 3 illustrates an example of an application definition, according to an embodiment.

FIG. 3 illustrates an example application definition 300, according to an embodiment. As shown, application definition 300 includes OS-specific VM descriptors $310_{1-N}$, as well as an application specific descriptor 320. Illustratively, OS-specific VM descriptors $310_{1-N}$ each include metadata $312_{1-N}$ specifying basic attributes of the associated VMs, such as the number of vCPUs, amount of storage, and amount of memory allocated to those VMs. The basic attributes may be a lowest common denominator of attributes present in the resource models used by all of VIMs 220, 260, and 280. In addition to the basic attributes, each of VM descriptors $310_{1-N}$ may include metadata $314_{1-N}$ specifying VIM-specific attributes (also referred to herein as "extensible parameters") of the associated VMs, which are attributes in the resource model of VIM 220 that may or may not be supported by other VIMs. Examples of VIM-specific attributes include security policies, media (ISOs, floppies, etc.) associated with a VM, a load balancing policy, what tier of an application a VM is, I/O requirements (e.g., a certain number of I/Os per second), attributes related to networking such as the type of connection (e.g., public versus private) to send traffic over, and so on. As discussed in greater detail below, such VIM-specific attributes may be mapped one-to-one in cases where the source and destination VIMs are of the same type, or in a best effort manner and/or with user defined mapping semantics if the source and destination VIMs are of different types.

Application-specific descriptor 320 includes metadata specifying overall policies associated with the application. Illustratively, application-specific descriptor 320 includes metadata specifying an application boot order (going across VMs) and connectivity between VMs (e.g., that the application includes two backend VMs front-ended by a web-facing VM or a load balancer VM). Other examples of application-specific descriptor 320 metadata include storage affinity policies and VM affinity policies. As discussed in greater detail below, an application-specific descriptor may also include resource policies defining what is and/or is not allowed to migrate.

Returning to FIG. 2, by translating VM metadata between resource models used by VIMs, embodiments disclosed herein permit VMs to be migrated between different virtual infrastructure platforms, such as the migration of VM $235_1$ from virtual infrastructure 200 to virtual infrastructure 240 discussed above. In one embodiment, a hybridity manager running in a source virtual infrastructure may receive a request to migrate a VM and, in response to the request, gather VM metadata from a VIM that manages the source virtual infrastructure, translate the gathered VM metadata that is represented in a resource model used by the VIM to a representation of the metadata in a resource model (the base resource model) used by the hybridity manager, and transmit the translated VM metadata to another hybridity manager associated with a destination virtual infrastructure. In turn, the other hybridity manager translates the received VM metadata to a representation of the metadata in a resource model used by a VIM that manages the destination virtual infrastructure, while dropping any (VIM-specific) attributes specified in the VM metadata that are not supported in the destination virtual infrastructure, as discussed in greater detail below. Further, the hybridity manager running in the destination virtual infrastructure causes the VIM that manages the destination virtual infrastructure to create a VM shell based on the VM metadata that has been translated into the representation in the resource model used by that VIM. Thereafter, data of a virtual disk associated with the VM may be transferred from the source to the destination virtual infrastructure and injected into the VM shell.

In one embodiment, hybridity managers 210, 250, and 280 are made aware of the resource models used by VIMs 220, 260, and 280 in virtual infrastructures 200, 240, and 275, as well as whitelists and/or blacklists indicating which attributes are enabled on virtual infrastructures 200, 240, and 275. In such a case, a handshake may be performed which exchanges known supported/unsupported attributes between hybridity managers during a VM migration, and unknown attributes may further be reconciled with the corresponding VIM if those attributes are not exchanged during the initial handshake. The whitelists and/or blacklists in particular, indicating which attributes are enabled on a virtual infrastructure, may be user-specified. It should be understood that virtual infrastructure providers (e.g., cloud providers) may choose not to expose all available VM attributes, typically for security purposes. For example, transparent page sharing may be a VM attribute that is disabled for security reasons. As another example, a new CPU flag set may be another VM attribute that is disabled. Using known resource models and whitelists and/or blacklists, among other things, hybridity managers 210, 250, and 280 may validate VM migrations before those migrations are performed. As discussed in greater detail below, a VM migration may fail when a hybridity manager determines that required attributes of the VM are not supported in the destination virtual infrastructure, or a warning notification may be displayed to a user if optional attributes of the VM are not supported.

Figure 4:
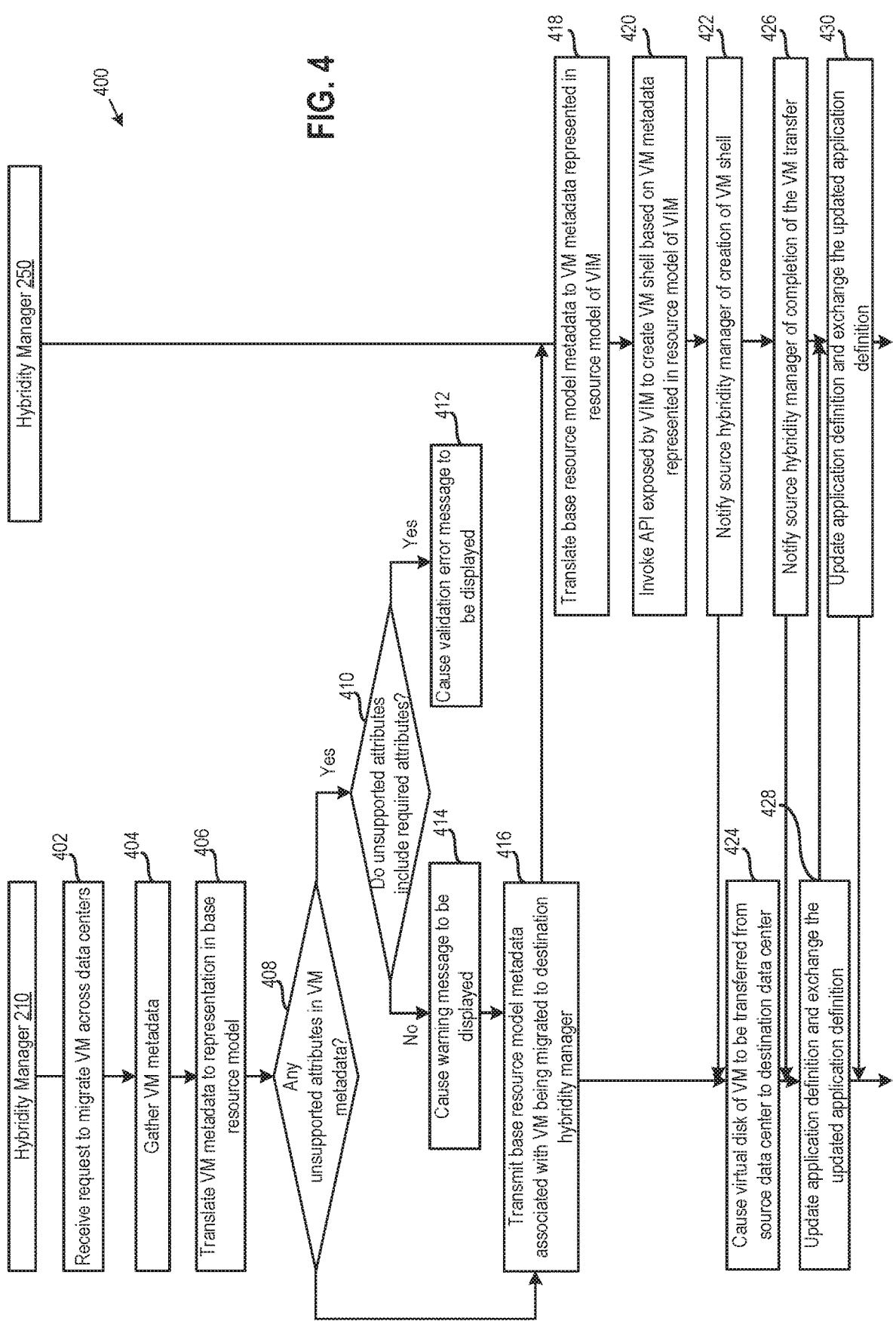
FIG. 4 illustrates a method of migrating VMs across virtual infrastructure platforms, according to an embodiment.

FIG. 4 illustrates a method 400 of migrating VMs across virtual infrastructure platforms, according to an embodiment. For exemplary purposes, it is assumed that the VM is being migrated from virtual infrastructure 200 to virtual infrastructure 240, and that the VM is part of an application including multiple VMs. More generally, the VM may be migrated from any virtual infrastructure to another virtual infrastructure, and need not be part of an application.

As shown, method 400 begins at step 402, where hybridity manager 210 receives a request to migrate a VM from virtual infrastructure 200 to virtual infrastructure 240. For example, the request to migrate the VM may be a user-initiated request.

At step 404, hybridity manager 210 gathers VM metadata relating to the VM being migrated from VIM 220. As described, the VM metadata being gathered may include metadata relating to the VM runtime, as well environmental metadata relating to things surrounding the VM, such as attributes that are needed for the VM to connect to its surroundings or perform optimally. The VM metadata relating to the VM runtime may generally be gathered up front (e.g., when building an inventory of virtual infrastructure 200 that hybridity manager 210 maintains) or on an as-needed basis, and the environmental metadata may be queried based on recent history of the VM. In one embodiment, hybridity manager 210 gathers VM metadata relating to a VM being migrated from VIM 220 by invoking an API exposed by VIM 220. For example, if VIM 220 is a vCenter® server, then the gathering of VM metadata may include querying the vCenter® server using a Simple Object Access Protocol (SOAP)-based API that is exposed by the vCenter® server, in order to obtain Open Virtualization Format (OVF) metadata. OVF is a VM distribution format that supports sharing virtual machines between products and organizations. Other VM distribution formats include Topology and Orchestration Specification for Cloud (TOSCA) and Open Management and Orchestration (OpenMANO) formats. Each of these formats includes a descriptor of VM components in the form of a metadata file (e.g., a JSON (JavaScript Object Notation) or XML (Extensible Markup Language) file). As another example, if VIM 220 is an OpenStack® VIM, then hybridity manager 210 may run a query for VM metadata using the OpenStack API exposed by the OpenStack® VIM. However, it should be understood that the descriptor (and other settings) returned upon invoking the OpenStack API may be for the Qcow2 disk format used by OpenStack®, which would have parameters that need to be mapped to parameters in, e.g., the VMX disk format (along with the other settings) if the destination virtual infrastructure is a vSphere® platform infrastructure, or vice versa.

At step 406, hybridity manager 210 translates the VM metadata to metadata represented in a base resource model format used by hybridity managers 210 and 250 (and 280). As described, hybridity manager 210 includes a translation layer 212 that may perform such a translation, and the translated VM metadata represented in the base resource model format may include basic attributes associated with the VM, such as a number of vCPUs, amount of storage, and amount of memory, as well as VIM-specific attributes. In one embodiment, hybridity manager 210 may also add the translated VM metadata to a VM descriptor in an application definition (e.g., application definition 300).

At step 408, hybridity manager 210 determines whether any attributes in the VM metadata are not supported in the destination virtual infrastructure 240. As described, hybridity manager 210 may be made aware of the resource model of virtual infrastructure 240, as well as a whitelist of supported attributes and/or a blacklist of unsupported attributes in virtual infrastructure 240. In one embodiment, hybridity manager 210 and hybridity manager 250 in the destination virtual infrastructure 240 may perform a handshake which exchanges known supported/unsupported attributes between hybridity managers during a VM migration, and unknown attributes may further be reconciled with the destination VIM if those attributes are not exchanged during the initial handshake. Hybridity manager 210 may then compare the attributes in the VM metadata to attributes supported in virtual infrastructure 240 as indicated in the resource model of virtual infrastructure 240, the whitelist, and/or the blacklist, in order to determine whether attributes in the VM metadata are supported in virtual infrastructure 240.

If any of the attributes in the VM metadata are not supported in destination virtual infrastructure 240, then hybridity manager 210 determines at step 410 whether the unsupported attributes include required attributes. For example, the VM being migrated may require graphics processing unit (GPU) support, but include an optional mounted ISO.

If the unsupported attributes include required attributes, then hybridity manager 210 causes a validation error message to be displayed to a user at step 412. For example, the validation error message may indicate that the VM migration has failed. Method 400 ends thereafter, as a functioning VM with required attributes cannot be created in virtual infrastructure 240. Returning to the example above of a VM requiring GPU support, if virtual infrastructure 240 does not provide GPU support, then the migration of such a VM would fail.

On the other hand, if the unsupported attributes do not include required attributes, then hybridity manager 210 causes a warning message to be displayed to the user at step 414. For example, the warning message may indicate the unsupported attributes. Returning to the example above of a VM with an optional mounted ISO, if virtual infrastructure 240 does not permit such an optional ISO, then hybridity manager 250 may cause a warning message to be displayed, but continue with the VM migration.

Assuming the VM migration can proceed, then at step 416, hybridity manager 210 transmits the base resource model metadata associated with the VM being migrated to hybridity manager 250. If the VM is part of an application, then the base resource model metadata that is transmitted may be a subset (e.g., a VM descriptor) of an application definition. The base resource model metadata may be transmitted in any suitable manner, such as over a hybridity control plane provided by a remote job framework that bootstraps connectivity between hybridity managers 210 and 250. An example of such a remote job framework is described in U.S. patent application Ser. No. 14/839,180 entitled Hybrid Task Framework and filed on Aug. 28, 2015, which is incorporated by reference herein in its entirety.

At step 418, translation layer 232 in hybridity manager 250 translates the base resource model metadata that hybridity manager 250 receives to a representation in a resource model used by VIM 260. That is, the translation layer 232 contextualizes the base resource model metadata to constructs in the resource model used by VIM 260, effectively mapping the received base resource model metadata to the resource model used by the VIM 260. During such a mapping, the values of basic VM attributes such as number of vCPUs, amount of memory, and amount of storage may remain unchanged, while other VIM-specific attributes such as storage affinity policies, VM affinity policies (e.g., requiring VMs that often communicate with each other to be collocated), etc. may be dropped or modified based on whether those VIM-specific attributes are supported in virtual infrastructure 240. In one embodiment, hybridity manager 250 may attempt to map as many VIM-specific attributes as possible to the resource model used by VIM 260*e*, and drop features that are not supported in virtual infrastructure 240. For example, if the source VIM 220 and the target VIM 260 are of the same system type, then the VIM-specific attributes may map one-for-one, in which case no features would be dropped. However, if the source VIM 220 and the target VIM 260 are not of the same system type, then the mapping may be best effort and/or performed with user defined mapping semantics, with both options allowing hybridity manager 250 to potentially reconcile parameters that do not map automatically.

At step 420, hybridity manager 250 invokes an API exposed by VIM 260 to create a VM shell based on the VM metadata represented in the resource model used by VIM 260. Then, at step 422, hybridity manager 250 notifies hybridity manager 210 of the creation of the VM shell in destination virtual infrastructure 240.

At step 424, hybridity manager 210 causes a virtual disk of the VM to be transferred from the source virtual infrastructure 200 to the destination virtual infrastructure 240. In one embodiment, a disk format of the virtual disk may also be converted to a disk format used in destination virtual infrastructure 240. Any feasible disk conversion and transfer techniques may be used, including well-known techniques. Disk attributes, including basic attributes such as the size of the disk and other attributes such as a required number of I/Os, may also be gathered, translated, and mapped to the destination side during steps 404 to 420 of method 400, discussed above.

In one embodiment, the VM migration may be a warm migration, in which most of the virtual disk contents are transferred from source data center 200 to destination virtual infrastructure 240 while the VM is still running. In such a case, the warm migration may include taking a snapshot of the virtual disk, transferring the snapshot data while the VM is running, capturing a delta of changes to the virtual disk during the transfer (while the VM is still running), powering down the VM, and transferring the delta to the destination virtual infrastructure 240.

At step 426, hybridity manager 250 notifies hybridity manager 210 of the completion of the VM migration. Then at steps 428 and 430, hybridity managers 210 and 250 update respective application definitions that they maintain and exchange the updated application definitions (e.g., via the control plane discussed above). The application definitions need to be updated, as the application definitions include summaries of all VM descriptors and should reflect the current state of those VMs. As a result of the updating and exchange of updated application definitions at steps 428 and 430, hybridity managers 210 and 250 end up with mirror images of the updated application definitions.

Virtual Computing Instance Mobility Passport

Figure 5:
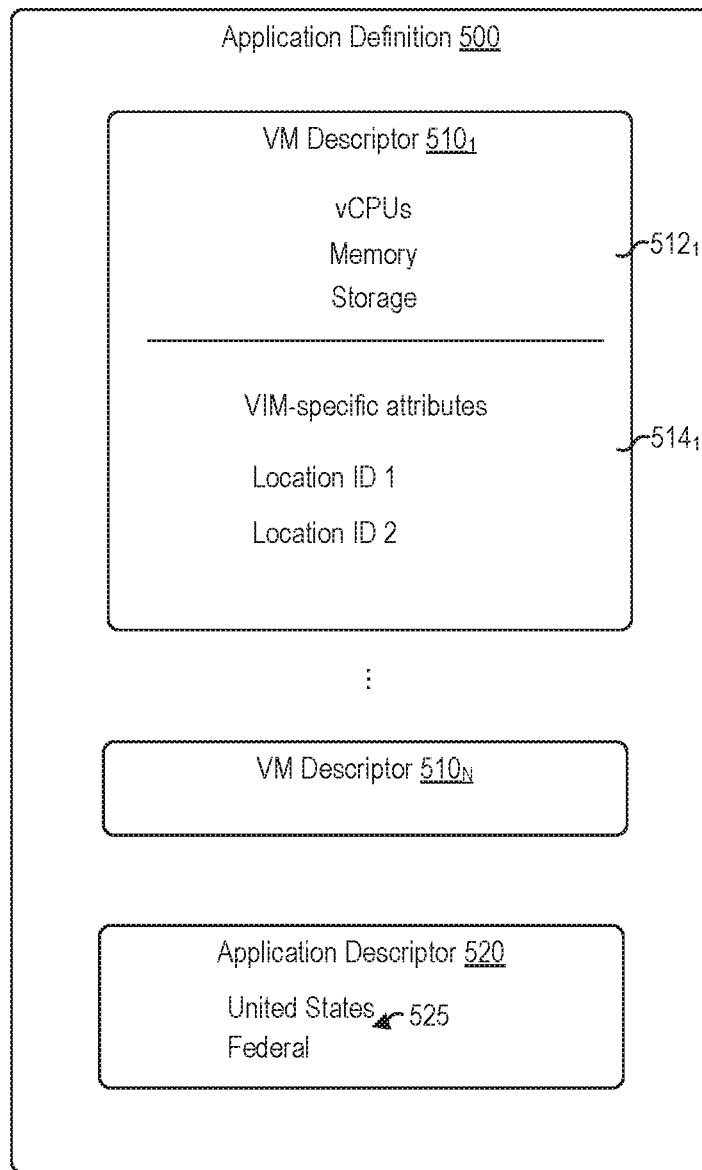
FIG. 5 illustrates an example of an application definition, according to another embodiment.

FIG. 5 illustrates an example of an application definition 500, according to another embodiment. As shown, application definition 500 includes VM descriptors $510_{1-N}$ and an application-specific descriptor 520, which are similar to VM descriptors $310_{1-N}$ and application-specific descriptor 320, respectively, that are described above with respect to FIG. 3, except application-specific descriptor 520 further includes metadata specifying resource policies 525. Resource policies 525 are user-specified policies defining what is and/or is not allowed to migrate. Resource policies 525 permit data governance and regulations to be enforced for borderless data centers, such as the system shown in FIG. 2 which includes virtual infrastructures 200, 240, and 275 in different geographic locations. Although resource policies 525 for the overall application are shown for illustrative purposes, resource policies that are specific to particular VMs may also be defined in VM descriptors $510_{1-N}$.

Illustratively, resource policies 525 in application definition 500 specify that VMs of the application must run in the United States and a federal data center. More generally, resource policies 525 may include any inbound and/or outbound conditions on VM workloads, such as a geographical location restriction requiring VMs of the application to run in particular countr(ies), a policy requiring VMs of the application to run in a particular zone such as a secured demilitarized zone (DMZ) or a development test zone, a policy requiring the data center to be compliant with payment card information (PCI) or a federal policy, and so on. PCI is the certification needed to process financial data in some applications. Further, each of the conditions in resource policies 525 may be defined as a positive condition that, when satisfied, results in a VM migration being allowed or a negative condition that, when not satisfied, results in a VM migration not being allowed. In one embodiment, resource policies may be defined in tuples (source+destination) specifying the source and destination virtual infrastructures that those resource policies apply to.

In one embodiment, a hybridity manager (e.g., hybridity manager 210, 250, or 280) is configured to validate migrations of VMs in an application associated with application definition 500 from one virtual infrastructure to another based on resource policies 525 specified in application-specific descriptor 520. Such validation based on resource policies 525 is akin to passport control. As described, application-specific descriptors may be exchanged between hybridity managers, and the resource policies for what is and/or is not allowed to migrate may be distributed and stored in each of the hybridity managers (e.g., hybridity manager 210, 250, and 280). For example, hybridity manager 210 may only allow migration of a VM in the associated application from virtual infrastructure 200 to another virtual infrastructure if the migration satisfies positive conditions for such a VM migration that are specified in resource policies 525, and hybridity manager 210 may fail the VM migration if negative conditions required for the VM migration and specified in resource policies 525 are not met.

After a VM migration is validated based on resource policies 525 and the VM migration is performed, a hybridity manager (e.g., hybridity manager 250 or 138) associated with the destination virtual infrastructure adds, to VM descriptor metadata 510 that is associated with the migrated VM, a location identifier (ID) of the hybridity manager and a timestamp. In one embodiment, a respective location ID may be obtained by each hybridity manager that registers with a local VIM and gathers inventory information (relating to VMs), and the location ID may be defined according to any suitable constraint or defining factor, such as geographic location. This assumes that the geographic locations of the VIMs are known. Adding the location ID and timestamp to VM descriptor metadata 510 is akin to stamping a passport and provides auditability and visibility into where the VM was. For example, if it is discovered that the VM was compromised on a certain date, then the location ID and timestamp information may be used to determine where the VM was running on that date. Illustratively, VM descriptor metadata $510_1$ includes the stamped location IDs 1 and 2, which may each be associated with timestamp information (not shown).

Figure 6:
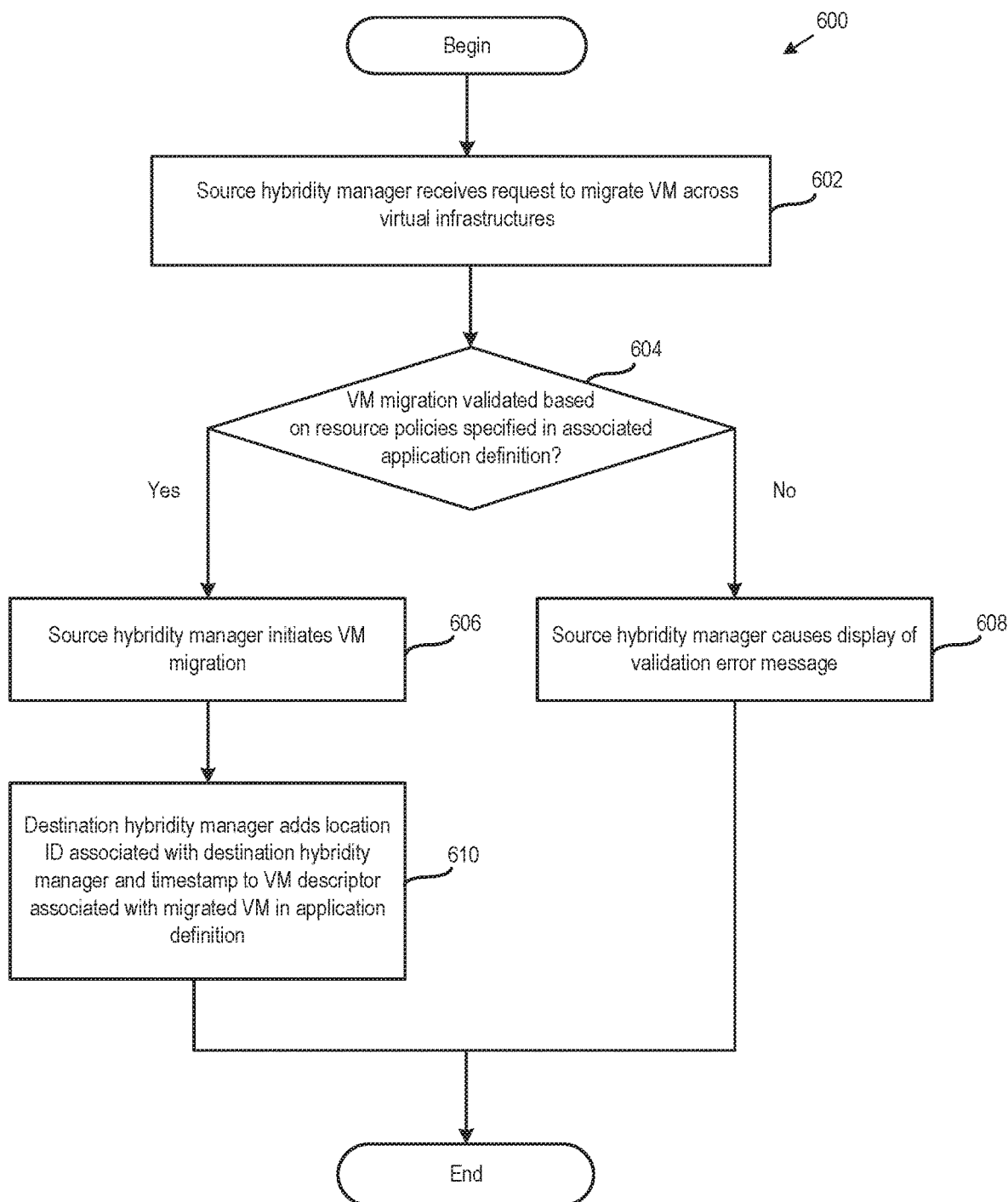
FIG. 6 illustrates a method of ensuring compliance and controls during VM migrations across virtual infrastructures, according to an embodiment.

FIG. 6 illustrates a method 600 of ensuring compliance and controls during VM migrations across virtual infrastructures, according to an embodiment. Once again, it is assumed for exemplary purposes that a VM is being migrated from virtual infrastructure 200 to virtual infrastructure 240, and that the VM is part of an application. More generally, VMs may be migrated from any virtual infrastructure to another, including virtual infrastructures managed by the same or different VIMs, and VMs being migrated do not need be part of applications.

As shown, method 600 begins at step 602, where hybridity manager 210 receives a request to migrate a VM from virtual infrastructure 200 to virtual infrastructure 240. Then, at step 604, hybridity manager 210 validates the VM migration based in part on resource policies specified in an associated application definition. Other validation steps may include determining whether required VM attributes are supported in the destination virtual infrastructure 240, as discussed above respect to steps 408-414 of method 400. The part of the VM migration validation based on resource policies may include allowing the VM migration if the migration satisfies positive conditions specified in the resource policies, and failing the VM migration if negative conditions required for the VM migration and specified in the resource policies are not satisfied.

If the VM migration is validated, then hybridity manager 210 initiates the VM migration at step 606. If, on the other hand, the VM migration is not validated, then hybridity manager 210 causes the display of a validation error message to a user at step 608. For example, the validation error message may indicate that the VM migration has failed.

Assuming the VM migration is performed, then at step 610, hybridity manager 250 adds a location ID associated with the hybridity manager 250 and a timestamp to a VM descriptor associated with the migrated VM in the application definition. As described, the updated application definition may also be exchanged with other hybridity managers associated with other virtual infrastructures where VMs of the application run (or are allowed to run).

Agent-Based Migration of Virtual Computing Instances and Physical Servers

Figure 7:
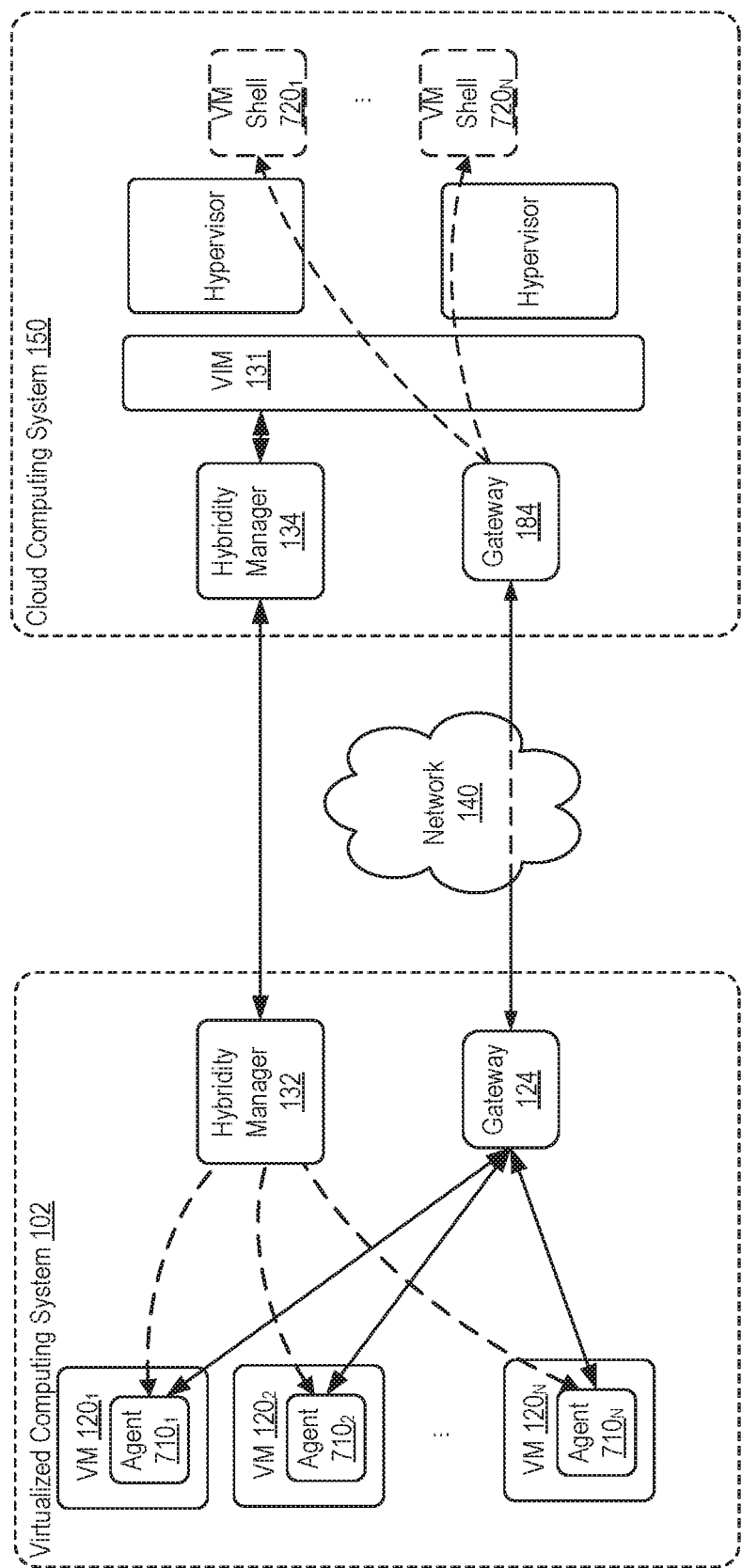
FIG. 7 illustrates an agent-based migration approach, according to an embodiment.

FIG. 7 illustrates an agent-based approach for migrating virtual computing instances such as VMs and physical servers to a virtual infrastructure, according to an embodiment. Unlike traditional VM migrations, the agent-based migration does not require access to the underlying hypervisor layer that supports VMs $120_{1-N}$ and may even be used to migrate physical servers (i.e., VMs $120_{1-N}$ may instead be physical servers). In one embodiment, agent-based VM migration may be used in conjunction with method 400, discussed above, to, e.g., transfer VM disk data at step 424.

As shown, hybridity manager 132 pushes one of agents 710$_{1-N}$ and certificates to each of VMs 120$_{1-N}$, and agents 710$_{1-N}$ run in VMs 120$_{1-N}$ thereafter. In one embodiment, hybridity manager 132 may gather user credentials and then push agents 710$_{1-N}$ to VMs 120$_{1-N}$ using the gathered credentials. Further, hybridity manager 132 may maintain a compatibility list indicating agents that are compatible with particular OS versions. That is, there is an OS compatibility for specific operating systems in the agent-based migration. In such a case, hybridity manager 132 may query for what OS and version is running in VMs 120$_{1-N}$ and then push the appropriate agents to those VMs 120$_{1-N}$ based on the OS version(s) and the compatibility list.

Each of agents 710$_{1-N}$ is responsible for introspecting the system it runs on. In one embodiment, each of agents 710$_{1-N}$ may determine how much CPU, memory, and storage is available to guest OSes running in VMs 120$_{1-N}$ based on OS settings, and other information relating to the VM's configuration. Each of agents 710$_{1-N}$ further establishes a secure communication channel with a southbound interface of a data plane over which data of VMs 120$_{1-N}$ may be transferred to cloud computing system 150, with the data plane having the southbound interface that is on a local LAN and a northbound interface that is facing a wide area network (WAN). Illustratively, the data plane is provided via a pair of gateways 124 and 184, and agents 710$_{1-N}$ each establish a secure communication channel with gateway 124 using the certificates received from hybridity manager 132.

As discussed in greater detail below, the migration of VMs 120$_{1-N}$ from virtualized computing system 102 to cloud computing system 150 may include using VM configuration information collected by agents 710$_{1-N}$ through introspection to create VM shells 720$_{1-N}$ having the same configuration in cloud computing system 150; streaming VM disk data over the secure communication channels established between agents 710$_{1-N}$ and gateway 124, with the streamed data then being injected by hypervisors into the VM shells created in cloud computing system 150; and powering down VMs 120$_{1-N}$ in virtualized computing system 102 and powering on the new VMs in cloud computing system 150. In one embodiment, hybridity manager 132 assigns a migration ID to each VM migration so that when VM disk data is streamed from multiple agents (e.g., agents 710$_{1-N}$), the data streams can be demultiplexed on the destination side based on the assigned IDs.

Figure 8:
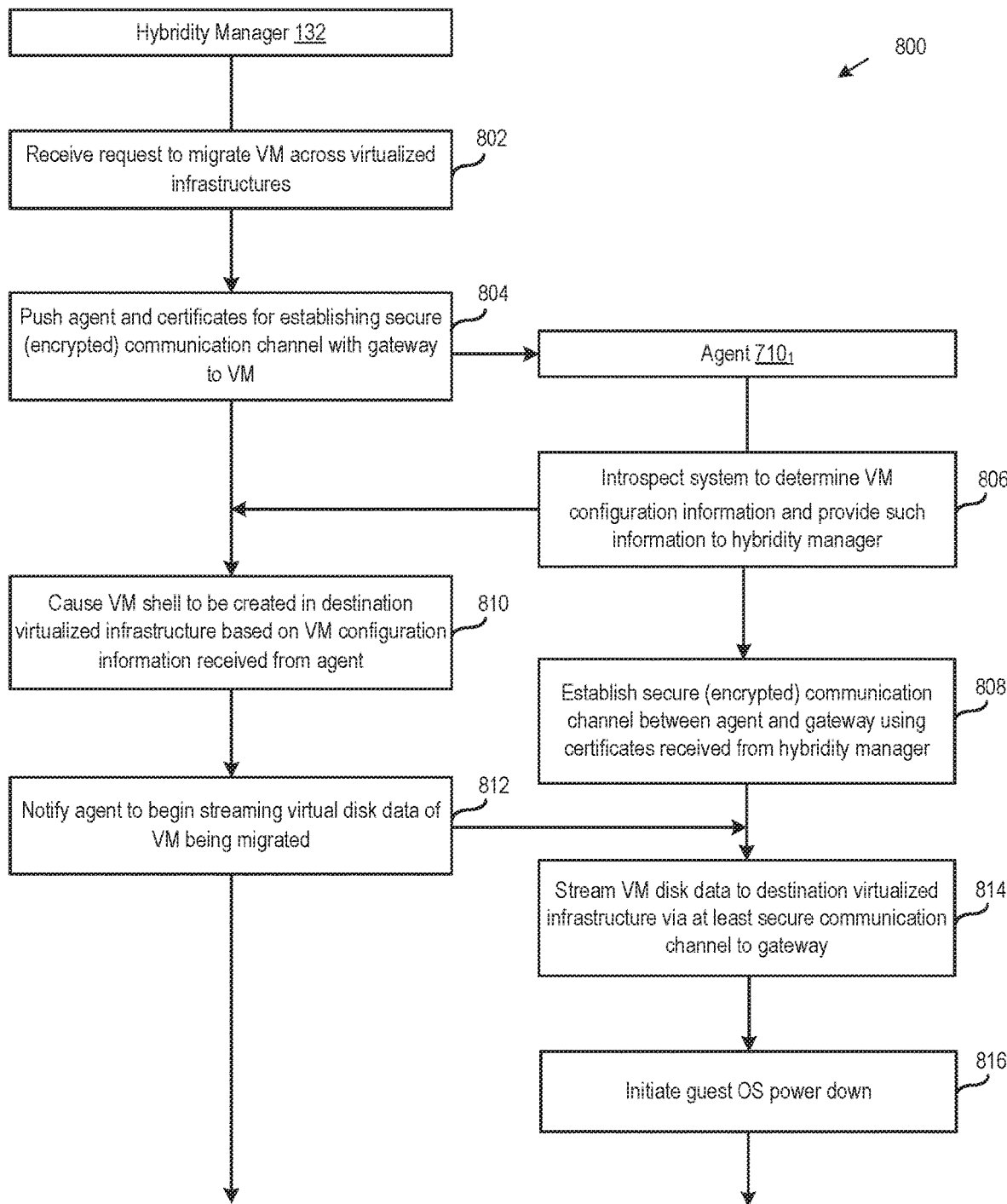
FIG. 8 illustrates a method of migrating VMs using agents, according to an embodiment.

FIG. 8 illustrates a method 800 of migrating VMs using agents, according to an embodiment. For exemplary purposes, it is assumed that VM 120$_1$ is being migrated from virtualized computing system 102 to cloud computing system 150 using agent 710$_1$, but, in general, any physical servers or VMs may be transferred to a virtual infrastructure, such as that provided by a cloud. The migration source may or may not be virtualized. In the case of a migration source with a virtual infrastructure, there may (or may not) be constraints denying access to an underlying hypervisor layer (or VIM) from which data about VMs would typically be collected.

As shown, method 800 begins at step 802, where hybridity manager 132 receives a request (e.g., a user-initiated request) to migrate a VM from virtualized computing system 102 to cloud computing system 150. Then, at step 804, hybridity manager 132 pushes agent 710$_1$ and certificates for establishing a secure (encrypted) communication channel with gateway 124 to VM 120. In one embodiment, hybridity manager 132 acts as a multi-site authorization layer ensuring that only the appropriate VMs for which migration instructions (e.g., from a user who has also entered credentials that are certificate-based) have been received are able to commence migration, that VM migrations are secured through the use of certificates (e.g., the same certificate-based credentials entered by the user) to establish secure communication channels with the data plane, and that VM data lands at its intended destination during the migration.

Then, at step 806, agent 710$_1$ introspects the system it runs on in VM 120 to determine VM configuration information and provides such information to hybridity manager 132. As described, agent 710$_1$ may determine, e.g., how much CPU, memory, and storage is available to the guest OSes based on OS settings, and other VM configuration information in one embodiment. In a particular embodiment, the VM configuration information that is collected may be similar to, or the same as, the VM metadata discussed above.

At step 808, agent 710$_1$ establishes a secure (encrypted) communication channel between itself and gateway 124 using the certificates received from hybridity manager 132. As described, the certificates may be certificate-based credentials gathered from a user in one embodiment. A secure communication channel may also be established between gateways 124 and 184, creating a fully encrypted pipeline between the source and destination sides.

At step 810, hybridity manager 132 causes a VM shell to be created in the cloud computing system 150 based on the VM configuration information received from agent 710$_1$. In one embodiment, hybridity manager 132 communicates over a control plane, discussed above, with hybridity manager 134 and sends an instruction to create the VM shell, and in turn hybridity manager 134 coordinates with a VIM in virtualized computing system 150 to create the VM shell having the same virtual CPUs, memory, storage, and other VM configuration settings as VM 120$_1$, based on the VM configuration information received from agent 710$_1$.

At step 812, hybridity manager 132 notifies agent 710$_1$ to begin streaming virtual disk data of the VM being migrated at step 812. That is, after the destination site is prepared for the VM migration by creating a VM shell, the stream of VM 120$_1$'s disk data may commence. In one embodiment, hybridity manager 132 may receive a notification from hybridity manager 134 indicating that the VM shell has been created, the sizes of the new VM's disks and file partitions, etc., and hybridity manager 132 may then initiate the VM migration in response to the receipt of such a notification. In addition, hybridity manager 132 may assign a migration ID to the VM migration, as described above.

At step 814, agent 710$_1$ streams the VM disk data to cloud computing system 150 via at least the secure communication channel to gateway 124 established at step 808. The data stream may generally depend on the OS type and be, e.g., a file-based or block-based stream. For example, in the case of Windows®, agent 710$_1$ may perform block-based tracking and block-based injections into a snapshotting layer. As another example, in the case of Linux®, agent 710$_1$ may tap into specific file handles that are open and gather data. On the destination side, a hyperviser running in the destination host may inject such VM disk data into the VM shell created at step 810 and reconstitute the data streamed by agent 710$_1$. Any suitable technique may be used by the hypervisor to perform such a data injection, including well-known techniques.

At step 814, agent 710$_1$ initiates a guest OS power down. That is, once VM data is fully transferred to cloud computing system 150, the guest OS may be quiesced and the VM powered down on the source side (i.e., in virtualized computing system 102), while the new VM in cloud computing system 150 may be powered on.

Advantageously, techniques disclosed herein permit virtualized computing instances such as VMs to be migrated, including across different virtual infrastructure platforms. As a result, users can shift or rebalance VMs between virtual infrastructures implemented using different virtual infrastructure platforms. In addition, the ability to migrate across virtual infrastructure platforms may prevent vendor lock-in by allowing users to relatively easily switch to infrastructure vendors of their choice. Further, a mobility passport technique is disclosed for enforcing resource policies during VM migrations, thereby providing compliance and controls for borderless data centers. In addition, an agent-based VM migration technique is disclosed that permits migration to a virtual infrastructure of physical servers and VMs running in otherwise unsupported virtual infrastructures, such as infrastructures where a hypervisor or VIM layer is inaccessible or infrastructures with new VIMs for which VM migration is not yet supported.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A computer-implemented method of migrating a physical computing system or a virtual computing instance to a virtual infrastructure, the method comprising:
   receiving at the physical computing system or the virtual computing instance one or more certificates from a hybridity manager in response to a request to migrate the physical computing system or virtual computing instance to the virtual infrastructure;
   determining configuration information via introspection of an operating system (OS) running in the physical computing system or the virtual computing instance, wherein a virtual computing instance shell is created in the virtual infrastructure based, at least in part, on the determined configuration information;
   establishing, based on the one or more certificates, a secure communication channel between the physical computing system or the virtual computing instance and a gateway;
   assigning a migration identifier (ID) to the physical computing system or virtual computing instance migration; and
   streaming data of a disk associated with the physical computing system or the virtual computing instance to the virtual infrastructure via the gateway using the secure communication channel, wherein:
      the streamed data is injected into the virtual computing instance shell;
      the virtual infrastructure receives streamed data for multiple disks associated with multiple physical computing systems or multiple virtual computing instances assigned different migration IDs;
      the multiple disks include the disk associated with the physical computing system or the virtual computing instance; and
      the virtual infrastructure de-multiplexes the data of the multiple disks based on the assigned migration IDs.

2. The computer-implemented method of claim 1, wherein the determining and the streaming are performed by an agent that is pushed by the hybridity manager to the OS running in the physical computing system or the virtual computing instance.

3. The computer-implemented method of claim 2, wherein the agent is one of a plurality of agents that is specific to the OS running in the physical computing system or the virtual computing instance.

4. The computer-implemented method of claim 1, further comprising, subsequent to the streaming of the data of the disk and the injection of the streamed data into the virtual computing instance shell:
   powering off the physical computing system or the virtual computing instance; and
   powering on the virtual computing instance shell having the injected streamed data.

5. The computer-implemented method of claim 1, wherein the streaming the data of the disk comprises file-based streaming or block-based streaming.

6. The computer-implemented method of claim 1, wherein the determined configuration information includes at least one of an amount of processing resources, memory, or storage.

7. A non-transitory computer-readable storage medium including instructions that, when executed by a processing unit, cause the processing unit to perform operations for migrating a physical computing system or a virtual computing instance to a virtual infrastructure, the operations comprising:
   receiving at the physical computing system or the virtual computing instance one or more certificates from a hybridity manager in response to a request to migrate the physical computing system or the virtual computing instance to the virtual infrastructure;
   determining configuration information via introspection of an operating system (OS) running in the physical computing system or the virtual computing instance, wherein a virtual computing instance shell is created in the virtual infrastructure based, at least in part, on the determined configuration information;
   establishing, based on the one or more certificates, a secure communication channel between the physical computing system or the virtual computing instance and a gateway;
   assigning a migration identifier (ID) to the physical computing system or the virtual computing instance migration; and
   streaming data of a disk associated with the physical computing system or the virtual computing instance to the virtual infrastructure via the gateway using the secure communication channel, wherein:
      the streamed data is injected into the virtual computing instance shell;
      the virtual infrastructure receives streamed data for multiples disks associated with multiple physical computing systems or multiple virtual computing instances assigned different migration IDs;
      the multiple disks include the disk associated with the physical computing system or the virtual computing instance; and
      the virtual infrastructure de-multiplexes the data of the multiple disks based on the assigned migration IDs.

8. The computer-readable storage medium of claim 7, wherein the determining and the streaming are performed by an agent that is pushed by the hybridity manager to the OS running in the physical computing system or the virtual computing instance.

9. The computer-readable storage medium of claim 8, wherein the agent is one of a plurality of agents that is specific to the OS running in the physical computing system or the virtual computing instance.

10. The computer-readable storage medium of claim 7, the operations further comprising, subsequent to the streaming of the data of the disk and the injection of the streamed data into the virtual computing instance shell:
    powering off the physical computing system or the virtual computing instance; and
    powering on the virtual computing instance shell having the injected streamed data.

11. The computer-readable storage medium of claim 7, wherein the streaming the data of the disk comprises file-based streaming or block-based streaming.

12. The computer-readable storage medium of claim 7, wherein the determined configuration information includes at least one of an amount of processing resources, memory, or storage.

13. A system, comprising:
one or more processors; and
one or more memories, the one or more processors and the one or more memories configured to perform operations for migrating a physical computing system or a virtual computing instance to a virtual infrastructure, the operations comprising:
receiving at the physical computing system or the virtual computing instance one or more certificates from a hybridity manager in response to a request to migrate the physical computing system or the virtual computing instance to the virtual infrastructure;
determining configuration information via introspection of an operating system (OS) running in the physical computing system or the virtual computing instance, wherein a virtual computing instance shell is created in the virtual infrastructure based, at least in part, on the determined configuration information;
establishing, based on the one or more certificates, a secure communication channel between the physical computing system or the virtual computing instance and a gateway;
assigning a migration identifier (ID) to the physical computing system or virtual computing instance migration; and
streaming data of a disk associated with the physical computing system or the virtual computing instance to the virtual infrastructure via the gateway using the secure communication channel, wherein:
the streamed data is injected into the virtual computing instance shell;
the virtual infrastructure receives streamed data for multiple disks associated with multiple physical computing systems or multiple virtual computing instances assigned different migration IDs;
the multiple disks include the disk associated with the physical computing system or the virtual computing instance; and
the virtual infrastructure de-multiplexes the data of the multiple disks based on the assigned migration IDs.

14. The system of claim 13, wherein the determining and the streaming are performed by an agent that is pushed by the hybridity manager to the OS running in the physical computing system or the virtual computing instance.

* * * * *